United States Patent [19]

Mayer et al.

[11] 4,374,192

[45] Feb. 15, 1983

[54] CARRIER COATING COMPOSITIONS OF BUTADIENE-ACRYLONITRILE RUBBER AND POLYURETHANE

[75] Inventors: Edward F. Mayer, San Jose; Arthur S. Diamond, Ventura, both of Calif.; Paul Chang, Hanover Park, Ill.

[73] Assignee: Ricoh Company, Ltd., Tokyo, Japan

[21] Appl. No.: 352,352

[22] Filed: Feb. 25, 1982

Related U.S. Application Data

[62] Division of Ser. No. 203,881, Nov. 4, 1980, Pat. No. 4,331,756.

[51] Int. Cl.$^3$ .................... G03G 9/10; B32B 25/02; B32B 27/40

[52] U.S. Cl. .................... 430/108; 428/407

[58] Field of Search .................... 430/108; 428/407

[56] References Cited

U.S. PATENT DOCUMENTS

| | | | |
|---|---|---|---|
| 3,526,533 | 9/1970 | Jacknow et al. | 430/108 X |
| 3,811,880 | 5/1974 | Browning | 430/108 |
| 4,042,517 | 8/1977 | Moriconi et al. | 430/108 |

FOREIGN PATENT DOCUMENTS

| | | | |
|---|---|---|---|
| 36927 | 3/1965 | German Democratic Rep. | 430/108 |

*Primary Examiner*—Roland E. Martin, Jr.
*Attorney, Agent, or Firm*—Guy W. Shoup; Henry T. Burke

[57] ABSTRACT

Electrophotographic developer compositions containing carrier, toner and special purpose additives such as flow promoters, dry lubricants and the like are prepared by coating carrier particles with a coating selected so that the triboelectric relationship between the surface of the carrier and the surface of the additive is substantially zero.

12 Claims, No Drawings

CARRIER COATING COMPOSITIONS OF BUTADIENE-ACRYLONITRILE RUBBER AND POLYURETHANE

This is a division of application Ser. No. 203,881, filed Nov. 4, 1980, now U.S. Pat. No. 4,331,756.

BACKGROUND OF THE INVENTION

In electrophotography, a photoconductor is charged and then exposed imagewise to light. In the area of the photoconductor which is exposed to light, the charge selectively leaks, while the dark areas retain the electrostatic charge in the form of a latent electrostatic image. The latent image is then developed by deposition of finely divided electroscopic material known as toner. The thus produced toner image may then be fixed to the photoconductive surface to produce a permanent visible image. Alternatively, the toner image may be transferred from the photoconductive surface to another support surface such as paper and then permanently fixed to the new support, for example, by heat.

A number of methods are available for developing the latent electrostatic image by deposition of toner. One is the cascade method which is described in U.S. Pat. No. 2,618,552 to Wise. Another is known as the magnetic brush process and is described in U.S. Pat. No. 2,874,063 to Greig.

In each of these methods, a developer comprising relatively large carrier particles together with a low proportion by weight of smaller toner particles is brought into contact with the latent image. The toner particles are held to the surface of the carrier particles by electrostatic forces which develop from the contact between the toner and carrier particles producing triboelectric charging of the toner and the carrier to opposite polarities. The toner particles are removed from the carrier when in contact with the latent electrostatic image by the stronger electrostatic attraction between the image and the toner.

Both systems include recycling of the developer and, obviously, continuing removal of toner from the initial developer supply as the toner is utilized to form images. The toner, therefore, must be replenished from time to time by the addition of fresh toner.

While the principal components of the developer are the carrier and the toner, it is customary to add special purpose additives, for example flow promoters, dry lubricants, and the like, in order to improve the developer. U.S. Pat. No. 3,720,617, for example, describes the addition of submicroscopic silicon dioxide particles to overcome various deficiencies of ordinary two component developers. This additive appears to assist in maintaining the stability of the electrical properties of toner and carrier when the developer is subjected to variation in humidity. The additive also assists in retarding deposition of films of toner material on reusable photoreceptor surfaces.

It is also known to add various lubricants such as zinc stearate or fluorohydrocarbon polymers such as polytetrafluoroethylene to the developer to enhance its flow properties.

The use of the additives, while they perform their special functions well, gives rise to a new problem. This is the problem of maintaining the concentration of the various components in the developer at a reasonably constant level as toner is continuously utilized to produce images and replenished from time to time.

The production of a large number of high quality images requires the delicate balance of many optical, mechanical and electrostatic properties. Amongst these, one of the most important is the triboelectric relationships between the components in the developer. If these relationships are continually changing with the production of images, the quality of the images will vary as more or less toner is deposited on successive latent electrostatic images.

The presence of a special purpose additive often gives rise to variations in the triboelectric relationship between the toner, the carrier and the additive since the additive may deposit on the carrier, or on the photoconductors, or it may be deposited with the toner as part of the image. In the last event, it exits the system. In the first two instances, the additive is subject to continuous recirculation. At any particular point in time, a specific sample of the additive may be on the carrier, on the photoreceptor or in the developer. The abrasive action of the moving components in the developer may thereafter remove the additive from the carrier or the photoreceptor so that the concentration of the additive in the developer is constantly changing. This perpetual fluctuation of concentration is not corrected when the toner supply is replenished since the replenishing charge normally has a fixed concentration of toner and additive. The end result is a continuously fluctuating triboelectric relationship between the toner and the carrier.

This fluctuation is readily observed by the variations in quality of the images produced. It may be quantitatively determined by measuring the charge to mass ratio of the developer. If this is continuously changing, the concentration of the components in the developer and the tribo relationships between the components of the developer must also be changing.

For convenience, this invention will be described principally as it relates to the lubricant, zinc stearate, as a minor component in a developer. Zinc stearate, which is normally employed as a finely divided powder, is a soft, non-abrasive material which when used in a developer as a flow promotor or a flow lubricant, tends to coat the carrier and to abrade from the carrier. As a result, the tribo relationship between the carrier and the toner is constantly changing. If it were possible to coat the carrier completely with zinc stearate, the characteristics would remain constant. As a practical matter, this is not possible since the abrasive action of the constantly moving developer continuously removes the zinc stearate.

In a typical developer, the toner is more strongly attracted by electrical charges to the carrier than the stearate is attracted to the carrier, and the stearate is weakly attracted to the toner by electric charges. At the same time, the stearate, because of its relative softness and flowability, tends to deposit on the carrier. As a result of the electrical attraction of the toner for the stearate, a relatively large amount of stearate is removed with the toner, but the amount changes constantly due to the varying tribo characteristics of the system resulting from the deposition and removal of zinc stearate from the surface of the carrier.

It has now been discovered that in an electrophotographic developer composition containing a minor amount of a special purpose additive, the concentration of the additive with respect to the toner and the carrier can be maintained essentially constant if the surface triboelectric relationship of the carrier and the additive is maintained substantially zero, i.e. there is substantially no difference. For example, in a developer comprising toner particles, zinc stearate and carrier particles, if the triboelectric difference between the surface of the carrier particles and the surface of the zinc stearate is zero, or close thereto the tribo relationship between the carrier and the toner will remain substantially constant. As a result, the amount of zinc stearate which exits the system with the toner remains substantially constant, and the relative concentrations of the toner-additive-carrier components in the developer can be maintained substantially constant by replenishing the toner and additive with a mixture containing fixed amounts of toner particles and zinc stearate. The fact that the system remains stable is visually evident by the uniformly constant quality of the reproductions even when as many as 80,000 or more copies are produced while the toner is continuously replenished to maintain a constant toner concentration while utilizing a total of 2 kg of developer. It can also be determined quantitatively by measuring the concentration of the components or by determining the charge to mass ratio, for example, in a Faraday box as described by Harpavat and Orr in the IAS '75 Annual, pages 158 to 164, or in U.S. Pat. No. 4,053,310 to Lee.

In the optimum practice of this invention, the triboelectric charge of the additive relative to the carrier is zero so that there is no bonding force holding the additive to the carrier. At the same time, there is a bonding force between the toner and the additive, so that the toner and the additive are held together. Ideally, the additive deposits on the latent electrostatic image with the toner in the same ratio as was present initially and is present in each successive replenishing charge. The amount of additive present in a developer is always very low. Only rarely will it be higher than 2% by weight based on the weight of the toner present. Typically, it will be 0.05% to 1.5%. Usually the amount of toner is at least fifty times the weight of the additive.

As is known, carrier particles normally comprise a core material and a coating. The diameter of the core material is generally from 50 to 1000 microns, preferably 100 to 600 microns. Any of a wide variety of materials may be used as the core. For use with the magnetic brush, the core should be a ferromagnetic material such as iron, steel, ferrite, etc. These same materials can be used with non-magnetic cores as can sand, glass beads or other known materials.

It is customary to coat the carrier core so as to improve the physical and chemical properties of the carrier particles. Typical coatings which have been used include cellulose acetate butyrate polymers, fluorocarbon polymers and the like.

U.S. Pat. Nos. 3,533,835 and 3,752,666 describe developer compositions in which the carrier is coated with lacquer. U.S. Pat. Nos. 3,526,533 and 3,627,522 to Jacknow et al. describe developers in which the carrier is coated with a mixture of styrene, acrylic polymers and organosilicones. Other coating materials and processes are described in U.S. Pat. Nos. 3,798,167, 3,947,271 and 4,053,310. However no completely satisfactory coating has yet been described. The prior art coatings are deficient for any of several reasons including, for example, difficulty in applying the coating; expense of the coating; carrier filming in which the carrier is gradually impacted by toner particles; requirement for extensive curing at high temperatures; tendency to chip, flake or peal; or failure to produce a sufficient number of acceptable copies per given quantity of developer.

The novel carrier coatings presently preferred for use in this invention substantially alleviate many of the above mentioned difficulties. They are miscible mixtures of butadieneacrylonitrile rubber containing from about 20% to 40% acrylonitrile together with a polyurethane elastomer. Coatings produced with these mixtures are tough, tenacious and non-tacky. They do not abrade away from the core nor do the thus coated carrier particles tend to adhere to the additives, the toner or the other surfaces with which they come in contact, including the photoreceptor surface. They are easily applied by solvent coating, do not require pretreatment of the carrier or a high temperature curing cycle.

The presently preferred butadiene-acrylonitrile rubbers contain from about 20% to 40% acrylonitrile. Typically useful rubbers include those having a specific gravity of from 0.95 to 1.00 and an average Mooney viscosity of from 30 to 80. Such rubbers are available commercially under the trademark Hycar from B. F. Goodrich. They are soluble in organic solvents especially polar organic solvents such as methyl ethyl ketone, acetone, tetrahydrofuran and dimethyl formamide.

The following table gives the code number and some of the characteristics of those Hycar rubbers which are useful in this invention.

| TYPE | % ACRYLONITRILE | SPECIFIC GRAVITY | AVERAGE MOONEY VISCOSITY |
|---|---|---|---|
| 1031 | 41 | 1.00 | 60 |
| 1042 | 33 | 0.98 | 80 |
| 1042F | 33 | 0.98 | 80 |
| 1094-80 | 21 | 0.95 | 80 |
| 1432 | 33 | 0.98 | 80 |

Hycar 1432 which is dusted with a ketone soluble polyvinyl chloride resin is the present rubber of choice because of the excellent results obtained through its use.

The polyurethanes useful in this invention are thermoplastic elastomers which are the reaction products of polyesters or polyethers and diisocyanates. They are film forming resins and are soluble in organic solvents such as those mentioned above. They are prepared by the reaction of linear hydroxy terminated polyesters, usually adipates; or polyethers, usually poly(oxytetramethylene) glycol with glycols such as ethylene glycol and 1,4-butanediol and diisocyanates, most commonly diphenylmethane-4,4'-diisocyanate.

The presently preferred elastomers are available from B. F. Goodrich under the trademark Estane. They are believed to be the reaction products of adipic acid, 1,4-butanediol and diphenylmethane-4,4'-diisocyanate. The presently preferred estane is sold as Estane 5715. It is preferred because it is readily soluble in methyl ethyl ketone, a common, inexpensive solvent which also dissolves the Hycar rubbers, and because it can be formed into an extremely hard, flexible film with excellent abrasion resistance. Its physical properties are shown below:

| PHYSICAL PROPERTIES | TYPICAL VALUE (1) | ASTM TEST PROCEDURE |
|---|---|---|
| Specific Gravity | 1.20 | D-792 |
| Hardness, Durometer A | 97 | D-2440 (2) |
| Durometer D | 63 | |

-continued

| PHYSICAL PROPERTIES | TYPICAL VALUE (1) | ASTM TEST PROCEDURE |
|---|---|---|
| Tensile Strength (psi) | 6150 | D-882 (3) |
| Modulus @ 100% Elongation (psi) | 1400 | |
| Elongation (%) | 300 | |
| Graves Tear (lbs/in) | 260 | D-1004 |
| Tear Propagation (lbs/in) | 120 | |
| Solution Viscosity (20% TS Concentration in MEK, Brookfield RVF Viscometer No. 2 Spindle, 20 rpm, 25° C.), cps. | 100-200 | (4) |

(1) Representative solution cast film data on typical production material.
(2) Test conducted on 75 mil tensile sheets.
(3) Test conducted on dumbbell film samples.
(4) Actual specification value.

The butadiene-acrylonitrile rubbers used in the practice of this invention possess extremely high positive triboelectric characteristics. Carrier coatings prepared from a solution of Hycar 1432 exhibit a triboelectric charge of over 60 microcoulombs per gram of toner in a developer mixture containing two parts of toner for every 98 parts of coated carrier beads. The polyurethanes, on the other hand, have relatively low to moderate positive triboelectric characteristics. For Estane 5715 the comparable charge is 15 microcoulombs. It has been found that the two polymers can be mixed in varying proportions and coated on core materials to produce carrier particles with selected triboelectric characteristics. The carrier particles when mixed with toner will manifest triboelectric characteristics intermediate the high of the butadieneacrylonitrile rubber and the low of the polyurethane elastomer.

The selected coating may be applied to the core by any suitable means to produce carrier particles which can be used with a wide variety of toner particles in accordance with the process of the invention. For example, the coating may be applied by dipping, spraying or tumbling the cores with a coating solution in a barrel or through a fluidized bed. The fluidized bed process is preferred since it permits the production of a uniform coating on the core particles. The process is described in U.S. Pat. Nos. 2,648,409, 2,799,241 and 3,253,944 to Wurster and 3,196,827 and 3,241,520 to Wurster et al.

In the Wurster fluidized bed process, for example, the cores are suspended and circulated in an upwardly flowing stream of heated gas such as air in a manner such that the particles move upwardly and are sprayed by the coating material in a first zone. Then, in a second zone, the particles settle through the air stream in a zone of lower air velocity and the liquid, which is a solvent and/or a dispersant of the sprayed coating evaporates to leave a thin solid coating on the particles. The particles recirculate to the first zone so that successive layers of the coating material are built up on the core in a uniform manner.

After the core has been coated to form the carrier particle, the coating is cured so as to possess the desired triboelectric properties. The curing process depends upon the material of the coating and the composition of the toner with which the carrier particles of the present invention are to be employed.

In this manner, novel coated carrier particles typically coated with from 0.25 to 2 g/Kg of carrier are prepared from organic solvent solutions containing a mixture comprising from 10% to 90% of the above described acrylonitrile-butadiene rubbers and 90% to 10% of the above described polyurethane elastomers based on the weight of the mixture. The core materials employed to produce the novel carrier particles include, for example, glass beads, steel shot and ferrite beads with diameters of from about 30 to 1000 microns. The thickness of the coatings may vary from about 1 to 20 microns, and is preferably 2 to 5 microns. Coatings prepared from mixtures containing 20% Hycar 1042 or 1432 together with 80% Estane 5715 are especially useful since the triboelectric relationship between the surface of these coated carriers and zinc stearate is close to zero.

The concept of this invention, that is the concept of establishing and maintaining the triboelectric relationship between the surface of the carrier particles and the surface of a minor additive substantially equal, thereby to control the relative concentration of electrophotographic developer components, is applicable to a variety of additives, carrier coatings and carrier cores. It is also applicable to a wide variety of toner particles. Typically, the toner particles are employed at a concentration of from about 5 to 75 g/Kg of coated carrier particles, or at a concentration of from about 0.05 to 7.5% by weight based on the weight of the carrier particles. Appreciable variation from these ranges can be tolerated, however, with different toner-additive-carrier combinations. The ranges are especially useful with dry electrophotographic developers employing zinc stearate or polytetrafluoroethylene as a lubricant.

Typical toner materials include polystyrene resin, acrylic resin, polyethylene resin, polyvinyl chloride resin, polyacrylamide resin, methacrylate resin, polyethylene terephthalate resin, polyamide resin, resinous condensation product of 2,2 bis-(4-hydroxyisopropoxyphenyl)-propane and fumaric acid and copolymers, polyblends and mixtures thereof. Vinyl resins having a melting point or melting range starting at least about 100° F. are especially suitable for use in the toners of this invention. These vinyl resins may be a homopolymer or a copolymer of two or more vinyl monomers. Typical monomeric units which may be employed to form vinyl polymers include styrene, vinyl naphthalene, mono-olefins such as ethylene, propylene, butylene, isobutylene and the like, vinyl esters such as vinyl acetate, vinyl propionate, vinyl benzoate, vinyl butyrate and the like, esters of alphamethylene aliphatic monocarboxylic acids such as methyl acrylate, ethyl acrylate, n-butylacrylate, isobutyl acrylate, dodecyl acrylate, n-octyl acrylate, phenyl acrylate, methyl methacrylate, ethyl methacrylate, butyl methacrylate and the like, vinyl ethers such as vinyl methyl ether, vinyl isobutyl ether, vinyl ethyl ether, and the like, vinyl ketones such as vinyl methyl ketone, vinyl hexyl ketone, methyl isopropenyl ketone and the like, and mixtures thereof. Generally, suitable vinyl resins employed in the toner have a weight average molecular weight between about 3,000 to 500,000.

Toner resins containing a relatively high percentage of styrene resin are especially useful because a greater degree of image definition is achieved with a given quantity of additive material. Further, denser images are obtained when at least about 25% by weight based on the total weight of resin in the toner, of a styrene resin is present in the toner. The styrene resin may be a homopolymer of styrene or styrene homologues or copolymers of styrene with other monomeric groups containing a single methylene group attached to a carbon atom by a double bond. Thus, typical monomeric materials which may be copolymerized with styrene by addition polymerization include: vinyl naphthalene; mono-olefins such as ethylene, propylene, butylene, isobutylene and the like; vinyl esters such as vinyl acetate, vinyl proprionate, vinyl benzoate, vinyl butyrate and the like; esters of alpha-methylene aliphatio monocarboxylic acids such as methyl acrylate, ethyl acrylate, n-butyl acrylate, isobutyl acrylate, dodecyl acrylate, n-octyl acrylate, phenyl acrylate, methyl methacrylate, ethyl methacrylate, butyl methacrylate and the like; vinyl ethers such as vinyl methyl ether, vinyl isobutyl ether, vinyl ethyl ether, and the like; vinyl ketones such as vinyl methyl ketone, vinyl hexyl ketone, methyl isopropenyl ketones and the like; and mixtures thereof. The styrene resins may also be formed by the polymerization of mixtures of two or more of the unsaturated monomeric materials with a styrene monomer.

The vinyl resins, including styrene type resins, may also be blended with one or more other resins if desired. When the vinyl resin is blended with another resin, the added resin is preferably another vinyl resin because the resulting blend is characterized by especially good triboelectric stability and uniform resistance against physical degradation. The vinyl resins employed for blending with the styrene type or other vinyl resin may be prepared by the addition polymerization of any suitable vinyl monomer such as the vinyl monomers described above. Other thermoplastic resins may also be blended with the vinyl resins of this invention. Typical non-vinyl type thermoplastic resins include: resin modified phenol formaldehyde resins, oil modified epoxy resins, polyurethane resins, cellulosic resins, polyether resins, polycarbonate resins and mixtures thereof. As indicated above, if the resin component of the toner contains styrene copolymerized with another unsaturated monomer or is a blend of polystyrene and other resins, a styrene component of at least about 25% by weight, based on the total weight of the resin present in the toner is preferred because denser images are obtained and a greater degree of image definition is achieved with a given quantity of additive material.

Typically, the size of the toner particles will be from about 1 to 20 microns.

The correct coating for use with a specific special purpose additive can be determined by a few simple tests using selected toner-additive combinations with a number of different coatings. In this procedure, fixed toner-additive mixtures are employed with various coated carriers to produce a number of electrophotographic copies, say 10,000. The quality of the prints is observed, the charge to mass ratio is measured and the concentration of toner is measured. If the copy quality remains uniform and the other values remain substantially constant, it follows that the triboelectric relationship between the coated carrier particles and the additive is zero or close to zero.

An alternative procedure can be used when the additive is capable of coating the carrier. In this procedure, the carrier is coated with the additive and the triboelectric relationship with respect to toner is observed. Separate samples of the carrier are then coated with selected coating materials and the triboelectric relationship with respect to the same toner is observed. If these latter observed relationships are approximately the same as the observed relationship when the carrier is coated with additive, the coating material will have substantially the same triboelectric relationship as the additive with respect to the same toner.

The second system described above works very well if zinc stearate is used as a lubricant additive. Since zinc stearate is relatively soft and flowable, it can be used to coat the carrier core. The triboelectric relationship between the thus coated carrier cores and the selected toner is observed. The carrier core is then coated with a number of different rubber-polyurethane elastomer combinations and the necessary measurements effected to determine the correct rubber-polyurethane combination. With Hycar 1042 or 1432 and Estane 5715, the optimum combination comprises 20% Hycar and 80% Estane by weight based on the weight of the mixture.

A third, and very convenient procedure is to measure the charge to mass ratio of the toner-carrier combination and the toner-carrier-additive combination. When these ratios are substantially the same, the additive has substantially the same triboelectric characteristics as the carrier.

The following non-limiting examples are given by way of illustration only.

EXAMPLE 1

A coated carrier is made from ferrite carrier core with a particle diameter of 100$\mu$ which is solution coated with a mixture of 80% Estane 5715 and 20% Hycar 1432 to a level of 1.2–1.3 g/Kg. The coated carrier is formulated into an electrophotographic developer composition by mixing at a concentration of 3.2% by weight toner particles, which toner particles comprise Atlac polyester resin 90 parts and carbon black 10 parts with a particle size of 5 microns. The toner particles also contain 0.5% by weight zinc stearate. The developer composition is used to prepare 80,000 sample copies. The charge to mass ratio of the original material is 16 microcoulombs per gram at a toner particle concentration of 3.2%. At the end of the run, which is conducted while continuously replenishing the toner particles, the charge to mass ratio is 13 microcoulombs per gram and the toner particle concentration is 3.15%. The zinc stearate concentration is practically constant. The advantages of the invention are readily obvious.

EXAMPLE 2

Example 1 is repeated except that the ferrite is replaced with steel shot. The results are substantially the same.

What is claimed is:

1. An electrophotographic developer composition comprising coated carrier particles together with toner particles, the coating comprising a miscible mixture of a butadiene-acrylonitrile rubber containing from about 20% to 40% by weight acrylonitrile together with a polyurethane elastomer, said mixture being soluble in organic solvents.

2. An electrophotographic developer composition of claim 1 wherein the concentration of toner particles is from 5 to 75 g/Kg of carrier particles.

3. Coated carriers for use in electrophotographic developer compositions comprising a core member coated with a miscible mixture comprising a butadiene-acrylonitrile rubber containing from about 20% to 40% by weight acrylonitrile together with a polyurethane elastomer, said mixture being soluble in organic solvents.

4. A coated carrier of claim 3 wherein the butadiene-acrylonitrile rubber contains about 41% acrylonitrile, has a specific gravity of 1.01 and an average Mooney viscosity of 60.

5. A coated carrier of claim 3 wherein the butadiene-acrylonitrile rubber contains about 33% acrylonitrile, has a specific gravity of 0.98 and an average Mooney viscosity of 80.

6. A coated carrier of claim 3 wherein the butadiene-acrylonitrile rubber contains about 21% acrylonitrile, has a specific gravity of 0.95 and an average Mooney viscosity of 80.

7. A coated carrier of claim 5 wherein the butadiene-acrylonitrile rubber is dusted with a ketone soluble polyvinyl chloride resin.

8. A coated carrier of claim 3 wherein the polyurethane elastomer is a hard, flexible, polyurethane elastomer soluble in methyl ethyl ketone, acetone and tetrahydrofuran, and has the following physical properties:

Specific Gravity: 1.20
Hardness,
Durometer A: 97
Durometer D: 63
Tensile Strength (psi): 6150
Modulus @ 100 Blongation (psi): 1400
Elongation (%): 300
Graves Tear (lbs/in): 260
Tear Propagation (lbs/in): 120
Solution Viscosity (20% TS Concentration in MEK, Brookfield RVK Viscometer No. 2 Spindle, 20 rpm, 25° C.), cps.: 100–200

9. A coated carrier of claim 4 wherein the polyurethane elastomer is a hard, flexible polyurethane elastomer soluble in methyl ethyl ketone, acetone and tetrahydrofuran, and has the following physical properties:

Specific Gravity: 1.20
Hardness,
Durometer A: 97
Durometer D: 63
Tensile Strength (psi): 6150
Modulus @ 100% Elongation (psi): 1400
Elongation (%): 300
Graves Tear (lbs/in): 260
Tear Propagation (lbs/in): 120
Solution Viscosity (20% TS Concentration in MEK, Brookfield RVK Viscometer No. 2 Spindle, 20 rpm, 25° C.), cps.: 100–200

10. A coated carrier of claim 5 wherein the polyurethane elastomer is a hard, flexible, polyurethane elastomer soluble in methyl ethyl ketone, acetone and tetrahydrofuran, and has the following physical properties:

Specific Gravity: 1.20
Hardness,
Durometer A: 97
Durometer D: 63
Tensile Strength (psi): 6150
Modulus @ 100% Elongation (psi): 1400
Elongation (%): 300
Graves Tear (lbs/in): 260
Tear Propagation (lbs/in): 120
Solution Viscosity (20% TS Concentration in MEK, Brookfield RVK Viscometer No. 2 Spindle, 20 rpm, 25° C.), cps.: 100–200

11. A coated carrier of claim 6 wherein the polyurethane elastomer is a hard, flexible polyurethane elastomer soluble in methyl ethyl ketone, acetone and tetrahydrofuran, and has the following physical properties:

Specific Gravity: 1.20
Hardness,
Durometer A: 97
Durometer D: 63
Tensile Strength (psi): 6150
Modulus @ 100% Blongation (psi): 1400
Elongation (%): 300
Graves Tear (lbs/in): 260
Tear Propagation (lbs/in): 120
Solution Viscosity (20% TS Concentration in MEK, Brookfield RVK Viscometer No. 2 Spindle, 20 rpm, 25° C.), cps.: 100–200

12. A coated carrier as in claim 10 wherein the butadiene-acrylonitrile rubber is dusted with a ketone soluble polyvinyl chloride resin.

* * * * *